(12) United States Patent
Buckley (10) Patent No.: US 7,769,000 B2
(45) Date of Patent: *Aug. 3, 2010

(54) SYSTEM AND METHOD FOR MANAGING CALL ROUTING IN A NETWORK ENVIRONMENT INCLUDING IMS

(75) Inventor: Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 298 days.

This patent is subject to a terminal disclaimer.

(21) Appl. No.: 11/328,875

(22) Filed: Jan. 10, 2006

(65) Prior Publication Data

US 2007/0165612 A1 Jul. 19, 2007

(51) Int. Cl.
*H04L 12/66* (2006.01)

(52) U.S. Cl. ............... 370/353; 370/354; 370/356; 379/88.17; 455/403; 455/428

(58) Field of Classification Search ............... 370/328, 370/356, 352, 401, 471, 392, 353, 354; 455/445, 455/403, 428; 379/88.17

See application file for complete search history.

(56) References Cited

U.S. PATENT DOCUMENTS

| | | | |
|---|---|---|---|
| 2004/0096042 A1* | 5/2004 | Orwick et al. ............... | 379/45 |
| 2005/0058125 A1* | 3/2005 | Mutikainen et al. ......... | 370/354 |
| 2005/0195762 A1 | 9/2005 | Longoni et al. | |
| 2005/0233727 A1 | 10/2005 | Poikselka et al. | |
| 2006/0209805 A1* | 9/2006 | Mahdi et al. ............... | 370/352 |
| 2006/0268900 A1 | 11/2006 | Larsson et al. | |
| 2006/0280169 A1* | 12/2006 | Mahdi ............... | 370/352 |
| 2007/0014281 A1* | 1/2007 | Kant ............... | 370/352 |
| 2007/0041367 A1 | 2/2007 | Mahdi | |
| 2007/0049281 A1* | 3/2007 | Chen et al. ............... | 455/445 |
| 2007/0058788 A1* | 3/2007 | Mahdi et al. ............... | 379/88.17 |

(Continued)

FOREIGN PATENT DOCUMENTS

EP 1 811 745 A1 7/2007

(Continued)

OTHER PUBLICATIONS

U.S. Appl. No. 60/689,883, filed Jun. 13, 2005.*

(Continued)

*Primary Examiner*—Fan Tsang
*Assistant Examiner*—Simon King
(74) *Attorney, Agent, or Firm*—The Danamraj Law Group, P.C.

(57) ABSTRACT

In one embodiment, a scheme is disclosed for managing call routing in a network environment including a circuit-switched (CS) network and an IP multimedia subsystem (IMS) network. When a call is originated by a user equipment (UE) device in the CS network, call information associated with the call is provided to a call continuity control function (CCCF) network node disposed in the IMS network. At the CCCF node, a pool of E.164 numbers are maintained as IP multimedia routing numbers (IMRNs) which are mapped to or otherwise associated with called party numbers. The CCCF node dynamically allocates a select IMRN with respect to a called party number received from the UE device and returns it to the UE device. The dynamically allocated IMRN is then utilized for routing the call towards the called party.

25 Claims, 7 Drawing Sheets

U.S. PATENT DOCUMENTS

| | | | |
|---|---|---|---|
| 2007/0064886 A1 | 3/2007 | Chiu et al. | |
| 2007/0165612 A1 | 7/2007 | Buckley | |
| 2007/0183410 A1 | 8/2007 | Song et al. | |
| 2008/0318565 A1* | 12/2008 | Stojanovski et al. | 455/422.1 |

FOREIGN PATENT DOCUMENTS

| | | |
|---|---|---|
| KR | 1020060114349 A | 11/2006 |
| WO | 2004068261 A2 | 8/2004 |

OTHER PUBLICATIONS

U.S. Appl. No. 60/710,056, filed Aug. 22, 2005.*
U.S. Appl. No. 60/713,143, filed Aug. 31, 2005.*
U.S. Appl. No. 60/724,730, filed Oct. 7, 2005.*
European Search Report; European Patent Office; Jun. 27, 2006; 3 pages (European Patent Application No. 06250631.6).
European Search Report; European Patent Office; Jun. 14, 2006; 2 pages.
"3rd Generation Partnership Project: Technical Specification Group Services and System Aspects; Voice Call Continuity between CS and IMS Study"; Technical Report; Global System for Mobile Communications; Dec. 2005; pp 1-153.
"Communication Management"; Communication Management; 1992; pp. 501-565.
Alexiou et al.; "The SIP Allocate Method"; Feb. 2002; pp. 1-9.
"Digital Cellular Telecommunications System (Phase 2+); Numbering, addressing and Identification"; Technical Specification; Sep. 2003; pp. 1-21.
European Search Report; European Patent Office; Sep. 17, 2007; 10 pages.
Oxley, D. et al.; "Techniques To Support VoIP Using WAP In A 2G and GPRS In 2.5G Networks"; 5 pages.
"3GPP TSG-SA2 Meeting #55"; Busan, South Korea; Oct. 23-27, 2006; pp. 1 through 7.
3rd Generation Partnership Project; Technical Specification Group Services and System Aspects; Voice Call Continuity between CS and IMS; Stage 2 (Release 7); Aug. 2006, 41 pages.
European Examination Report; European Patent Office; Jul. 20, 2006; 5 pages.
Korean Patent Office; Notice Requesting Submission of Opinion with English Translation; Aug. 7, 2008; 11 pages.
European Search Report; European Patent Office; Jan. 2, 2008; 14 pages.
3rd Generation Partnership Project; Technical Specification Group Services and System Aspects; Voice Call Continuity (VCC) between Circuity Switched (CS) and IP Multimedia Subsystem (IMS); Stage 2 (Release 7); Jun. 2007; 36 pages.
European Patent Office; EP Search Report for Application No. 06118838.9-1244; Jan. 23, 2007; 6 pages.
3rd Generation Partnership Project; Technical Specification Group Services and System Aspects; Voice Call Continuity between CS and IMS Study; Global System for Mobile Communications; Release 7; Dec. 2005; pp. 1-153.
T. Alexiou et al.; The SIP Allocate Method; Sipping Working Group; Feb. 2002; pp. 1-9.
Communication Management; XP-002103158; 501-565.
Examiner's First Report for Application No. 2007221785; Australian Government, IP Australia; Jan. 29, 2009; 2 pages.
PCT Notification of Transmittal of the International Searching Report and the Written Opinion of the International Searching Authority, or the Declaration; International Searching Authority; Sep. 23, 2008; 14 pages.
European Search Report; European Patent Office; Oct. 22, 2008; 8 Pages.
EPO Extended European Search Report in Application No. 09154845.3; European Patent Office; Apr. 22, 2009; 6 pages.
China Office Action, Application No. 200710007388.8; Republic of China; Oct. 30, 2009; 9 pages.

* cited by examiner

SYSTEM AND METHOD FOR MANAGING CALL ROUTING IN A NETWORK ENVIRONMENT INCLUDING IMS

FIELD OF THE DISCLOSURE

The present patent disclosure generally relates to call routing in communications networks. More particularly, and not by way of any limitation, the present patent disclosure is directed to a system and method for managing call routing in a network environment including a circuit-switched (CS) network and an IP multimedia subsystem (IMS) network, wherein a CS-originated call is to be routed using the IMS network infrastructure.

BACKGROUND

Mobile voice-over-IP (VoIP) handover is the process of continuing a voice call as a user moves between IP-based networks (e.g., wireless LAN (WLAN) or Wi-MAX networks, etc.) and circuit-switched cellular networks. To effectuate such handover, current $3^{rd}$ Generation Partnership Project (3GPP) standards specify that when a dual mode wireless device originates a call requiring inter-domain continuity, the call be routed to a call continuity control function (CCCF) element that is disposed in a new, IP-based network architecture referred to as the IP multimedia subsystem (IMS). One of the proposed solutions to implement the call routing process involves providing a Public Service Identity in the form of an E.164 number (e.g., a called party number) to which a call reference identity may be appended to generate an IP multimedia routing number (IMRN). However, when call reference identity digits are appended to the E.164 number, it results in a number that is longer than the 15-digit length limitation specified under the ITU-T standards. It is therefore possible that the extra digits may be lost when such a number is routed via a network. Further, if there is a reliance on the Caller ID information being provided to the CCCF element in the IMS network, this information may be lost in the international ISDN infrastructure using the ISDN User Part (ISUP) signaling.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for managing call routing in a network environment including a circuit-switched (CS) network and an IP multimedia subsystem (IMS) network. When a call is originated by a user equipment (UE) device in the CS network, appropriate call information associated with the call is provided to a CCCF network node disposed in the IMS network. At the CCCF node, a pool of E.164 numbers are maintained as IP multimedia routing numbers (IMRNs) which are mapped to or otherwise associated with called party numbers. The CCCF node dynamically allocates a select IMRN with respect to a called party number received from the UE device and returns it to the UE device. The dynamically allocated IMRN is then utilized for routing the call towards the called party, after which it may be released back to the pool of IMRNs for future use. Appropriate timers may be provided at the device and CCCF endpoints so that it can be verified whether a call reference number associated with the call remains valid (e.g., it has not timed out) or the dynamically allocated IMRN remains valid (e.g., it has not timed out). Optionally, the released IMRN may be quarantined for a period of time.

In one aspect, a method is disclosed for routing a call in a network environment including a CS network and an IMS network, the call being originated in the CS network portion by a UE device towards a called party, the method comprising: providing call information associated with the call from the UE device to a CCCF network node disposed in the IMS network; at the CCCF network node, dynamically allocating an IMRN selected from a pool of IMRNs, wherein the dynamically allocated IMRN is mapped to the called party's number; providing the dynamically allocated IMRN to the UE device from the CCCF network node; and utilizing the dynamically allocated IMRN for routing the call towards the called party.

In another aspect, disclosed herein is a UE device operable to originate a call in a network environment including a CS network and an IMS network, the call being directed towards a called party, the device comprising: means for providing call information associated with the call to a CCCF network node disposed in the IMS network portion, the call information including a call reference number; means, responsive to receiving a dynamically allocated IMRN from the CCCF network node, wherein the dynamically allocated IMRN is selected from a pool of IMRNs and mapped to the called party's number, for verifying that the call reference number remains valid (e.g., it has not timed out); and means, responsive to verifying that the call reference number is valid, for providing the dynamic IMRN to a network entity in order to initiate a call routing process with respect to the called party using the dynamically allocated IMRN.

In yet another aspect, disclosed herein is a network node having CCCF capability and disposed in an IMS network, the network node comprising: means for maintaining a pool of IMRNs that are configured to a range of called party numbers, wherein a select IMRN is dynamically allocable to a called party number received from a UE device with respect to a call originated in a circuit-switched network; means for dynamically allocating the select IMRN to the called party number received from the UE device and for providing the select IMRN to the UE device; and means for verifying that the select IMRN remains valid (e.g., it has not timed out) when the select IMRN is returned to the network node for effectuating a call routing process with respect to the call.

Figure 1:
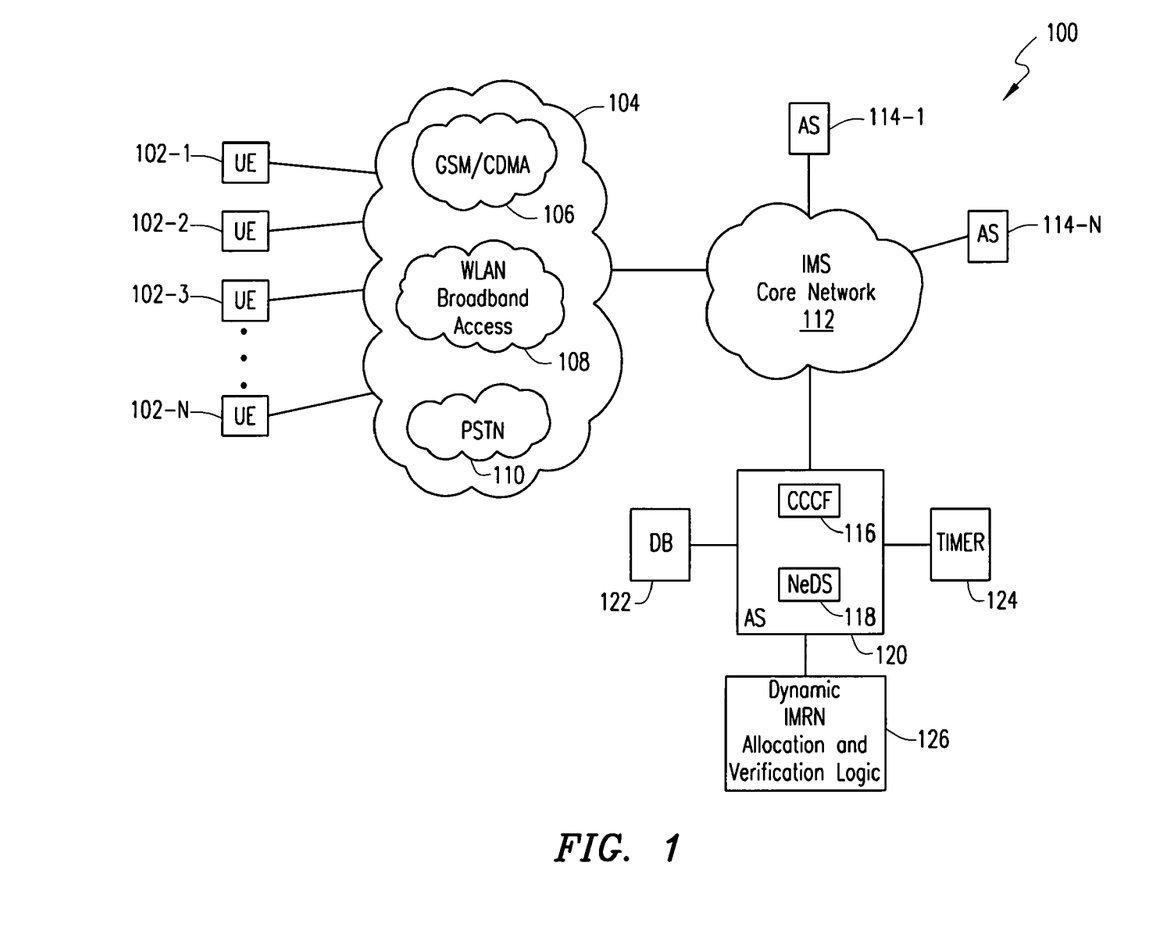
FIG. 1 depicts a network environment including circuit-switched network infrastructure and IP multimedia subsystem (IMS) infrastructure wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for managing call routing with respect to a call originated by a UE device in a circuit-switched network. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" to be the network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and inter-operation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable.

Continuing to refer to FIG. 1, reference numerals 114-1 to 114-N refer to a plurality of AS nodes operable to support various services, e.g., VCC, PTT, etc., as alluded to hereinabove. Furthermore, in order to effectuate call continuity and appropriate domain selection, another network node or AS 120 may be provided as part of the subscribers' home IMS core network which implements functionality referred to as call continuity control function (CCCF) 116 and network domain selection (NeDS) 118. In essence, the CCCF portion 116 of AS 120 is operable as a new IMS application server element that resides in the home IMS network and tracks all call sessions and related mobile voice-over-IP (VoIP) bearer traffic, including call handover/routing between CS and IMS domains. The NeDS portion 118 of AS 116 is responsible for performing, inter alia, registration/de-registration management between the IMS and CS networks (e.g., GSM or CDMA). Although potentially separate functions, it is possible to integrate both the CCCF and NeDS functionalities into a single IMS-compatible network element 120 as illustrated in FIG. 1. Additionally, appropriate database structures (e.g., DB 122), timer mechanisms (e.g., timer 124) and suitable logic 126 may be provided in association with AS 120 for purposes of configuring and managing a pool of IP multimedia routing numbers (IMRNs) from which a select IMRN may be dynamically allocated for purposes of call routing as will be described in greater detail below.

As alluded to in the Background section of the present patent application, when a wireless device originates a call in the CS domain, which may require call continuity while the call is in progress, that call is routed to the CCCF node of the subscriber's home IMS network. However, such call routing process is known to have various deficiencies as has been pointed out earlier.

In accordance with the teachings of the present patent disclosure, the IMS network node having the CCCF capability is preferably provided with appropriate logic/structure/software/firmware module(s) for performing the following: maintaining a pool of E.164 numbers that are operable as IMRNs which terminate on the CCCF node, wherein a select IMRN is dynamically allocable to a called party number received from a UE device; dynamically allocating the select IMRN to a received called party number and providing the select IMRN to the originating UE device; verifying that the select IMRN has not timed out when that select IMRN is returned to the network node for effectuating a call routing process with respect to the called party number; and optionally, quarantining the select IMRN for a period of time upon releasing it back to the IMRN pool for future use.

To manage a pool of dynamically allocable IMRNs, the CCCF node (e.g., AS 120) may be configured in a number of ways with respect to the E.164 numbers. For example, a particular E.164 number may be provided as a "starting address" number of an IMRN range. Another E.164 number may operate as a range delimiter with respect to the IMRN range. To allow flexibility, it may be desirable to provide for different pools of IMRNs to be configured from different number ranges. Further, appropriate timer mechanism(s) may be implemented at the CCCF node in order to ensure that the allocated IMRNs remain valid (e.g., they have not timed out, that is, they are used within appropriate time limits) or suitable quarantine times are applied. As will be described in detail below, management of timers associated with IMRNs at the CCCF node and timers associated with call reference numbers at the originating UE device allows for dynamic provisioning of IMRNs that could be used for call routing without having to append extra digits to the E.164 number to create an IMRN.

Figure 2:
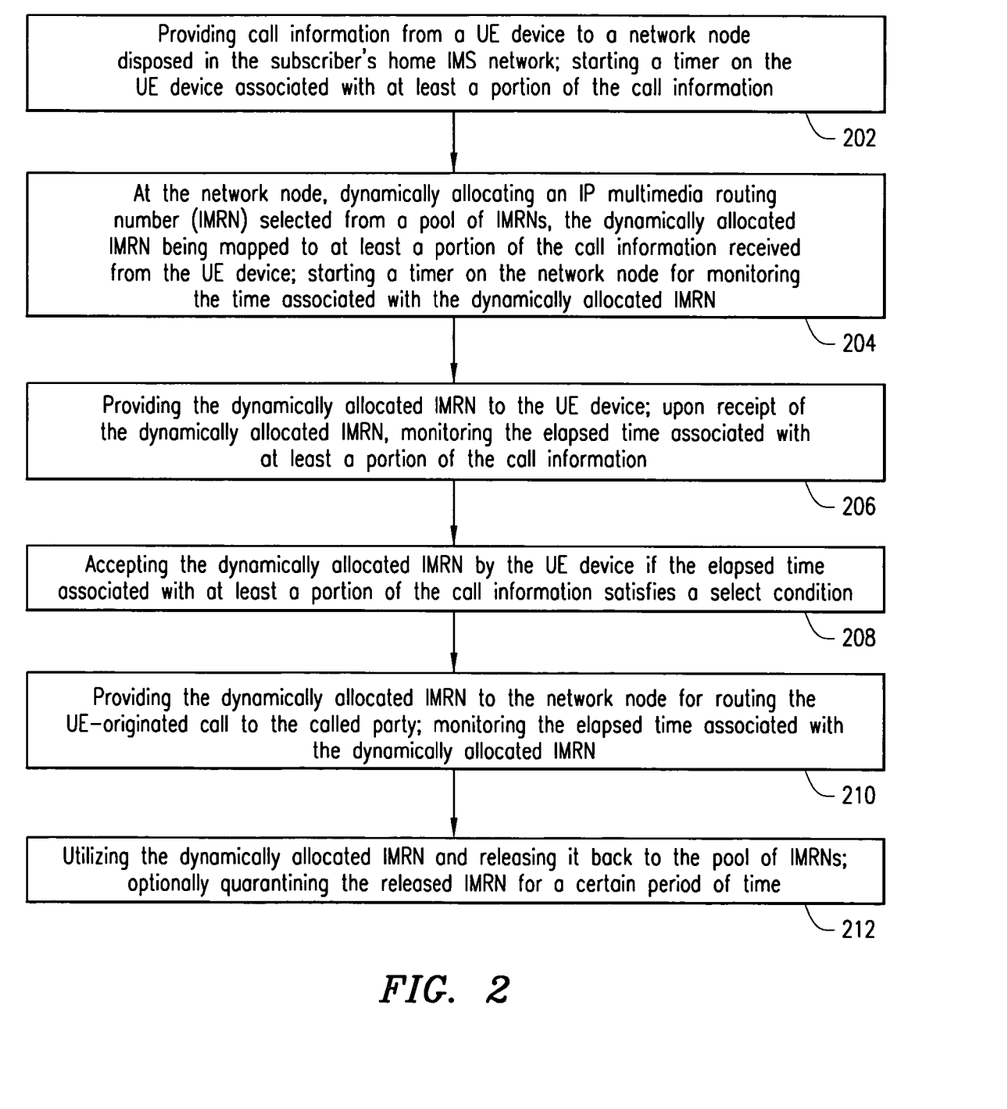
FIG. 2 depicts a flowchart of an exemplary embodiment of the present patent disclosure.

FIG. 2 depicts a flowchart of an exemplary embodiment of an overall methodology of the present patent disclosure for managing call routing with respect to a CS-originated call by a UE device. At block 202, various pieces of information relating to the call (which may be collectively referred to as "call information" herein), such as a call reference number associated with the call, called party number (or, the B number), sub-address information, etc., are provided by the originating UE device to an IMS network node, e.g., the CCCF network node. Also, a timer may be initiated on the UE device that is used for monitoring at least a portion of the call information. In particular, the timer is implemented for monitoring the elapsed time since a particular call reference number is generated and forwarded to the CCCF node. At the CCCF network node, an IMRN selected from the pool of IMRNs is dynamically associated with respect to the call reference number, wherein the IMRN is mapped to the at least a portion of the call information, e.g., the received called party number (block 204). Also, a timer may be started at the network node for monitoring a time-to-live variable associated with the dynamically allocated IMRN. Thereafter, the dynamically allocated IMRN is provided to the UE device using appropriate messaging as will be described below. Upon receipt of the dynamically allocated IMRN at the UE device, the elapsed time associated with the call reference number is monitored to ensure that it is not stale (block 206). The dynamically allocated IMRN is accepted by the UE device if the time elapsed satisfies a select condition, e.g., within a time-to-live value (block 208). Appropriate setup is then initiated by the UE device using the dynamic IMRN, whereby the accepted IMRN is returned to the CCCF node since it terminates on the CCCF node. Upon receipt of the IMRN at the network node, its time-to-live variable is monitored to ensure that it has not timed out (block 210). Thereafter, the called party number associated with the dynamically allocated IMRN is utilized for routing the call. In one implementation, the dynamic IMRN may optionally be returned back to the pool of IMRNs wherein it may be quarantined for a certain period of time before it is reused or becomes available for future use (block 212).

Based on the foregoing, those skilled in the art will appreciate that when the call information, i.e., called party number, call reference number, etc., is sent by the UE device to the serving CCCF node, appropriate logic at the CCCF node may create a record that maps the received call information to an E.164 -based IMRN, which is transmitted back to the UE device. Upon correlating the IMRN with the call reference number, the UE sets up a call using the IMRN that terminates on the CCCF node. The IMRN is then interrogated against the record to retrieve the original called party number for routing the call to the called party.

It should be recognized by those skilled in the art that the message flow between the UE device and the home IMS network's CCCF node may be mediated through a number of other appropriate network infrastructure elements, and may be implemented in a number of ways depending on the device capabilities as well as the network features and protocols being used. Typically, the message flow may be mediated via network elements such as a mobile switching center (MSC) and a media gateway control function (MGCF) element disposed between the UE device and its home IMS CCCF node. Set forth below are a number of exemplary implementations of the message flow where a dynamically allocated IMRN is utilized for call routing with respect to a call originated in the CS domain.

Figure 3:
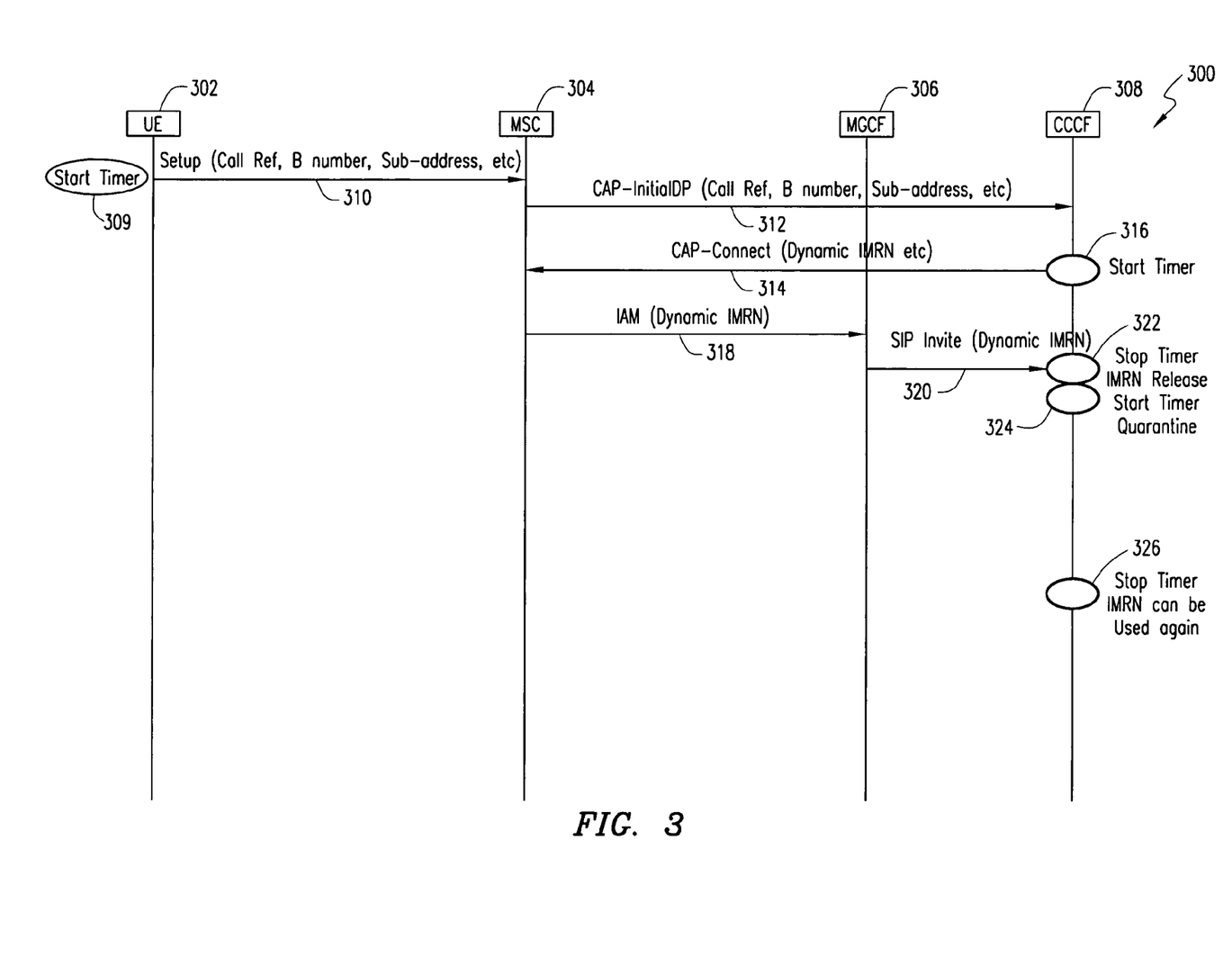
FIG. 3 depicts a message flow diagram for call routing by employing dynamically allocated IP multimedia routing numbers (IMRNs) in accordance with an embodiment.

FIG. 3 depicts a message flow embodiment 300 for call routing based on dynamic IMRN allocation where Customized Applications for Mobile Enhanced Logic (CAMEL) is implemented. A wireless UE device 302 having the CS domain and IMS domain modes of functionality is operable to generate a setup message 310 to a visited MSC 304, wherein the setup message includes applicable call information such as call reference identity or number, called party number, sub-address information, and the like. A suitable timer mechanism 309 may be initiated at the UE device in order to monitor a time-to-live variable associated with the call reference number. Responsive to the setup message 310, MSC 304 generates a CAMEL Application Part (CAP)-compatible message 312, Initial Detection Point (DP) message, which carries the call information to a CCCF network node 308 disposed in the user's home IMS network. Upon verifying that the user is allowed to do a VCC call, the CCCF node dynamically allocates a select IMRN based on the received called party number and returns it back to MSC 304 via a CAP Connect message 314. A suitable timer mechanism may be started (block 316) at the CCCF node 308 in order to monitor a time-to-live variable associated with the dynamically allocated IMRN. After verifying that the call reference has not timed out based on the UE device's timer mechanism, responsive to receipt of the CAP Connect message 314, MSC 304 initiates an Initial Address Message (IAM) 318 that includes dynamic IMRN towards MGCF 306 for call routing. A SIP Invite message 320 is generated by MGCF 306 towards the CCCF node 308 which utilizes the dynamic IMRN—called party number mapping for routing the call to the called party (not shown). It should be recognized that various intermediate SIP messages and resource allocation/reservation negotiations may take place between MGCF 306 and the called party subsequent to SIP Invite 320, which are not described in particular detail herein. Also, additional ISUP messaging that takes place before a bearer path is established between the UE device 302 and the called party is not shown herein.

Upon receipt of the dynamically allocated IMRN via SIP Invite 320 at the CCCF node 308, the timer mechanism may be stopped (block 322) to verify if the IMRN has timed out. If so, the SIP Invite message may be discarded and the call routing process may be terminated. If the IMRN has not timed out, the CCCF may set up the call using the original called number against the IMRN to the correct destination. Additionally, if no CallerID (CID) was received in the SIP invite message 320, the CCCF node 308 may insert the CID with appropriate privacy options. After using the IMRN for call routing by CCCF, it may be returned to the IMRN pool, wherein a quarantine timer may be started (block 324) such that the IMRN is prohibited from further use until the quarantine timer is stopped after a period of time (block 326).

As pointed out previously, the timer mechanism at the device side may also be used to ensure that the call reference number has not timed out, which reference number is used by the UE device to correlate the information received from the CCCF (e.g., dynamic IMRN). If the timer expires before the same reference number is received back from the CCCF node, the UE device may reattempt the call process a predetermined number of times (e.g., five attempts), after which if no response has been received, the call procedure may be deemed to have failed. In other words, if the UE device receives a reference number that is no longer valid, it may be discarded and the call procedure may be terminated.

Figure 4:
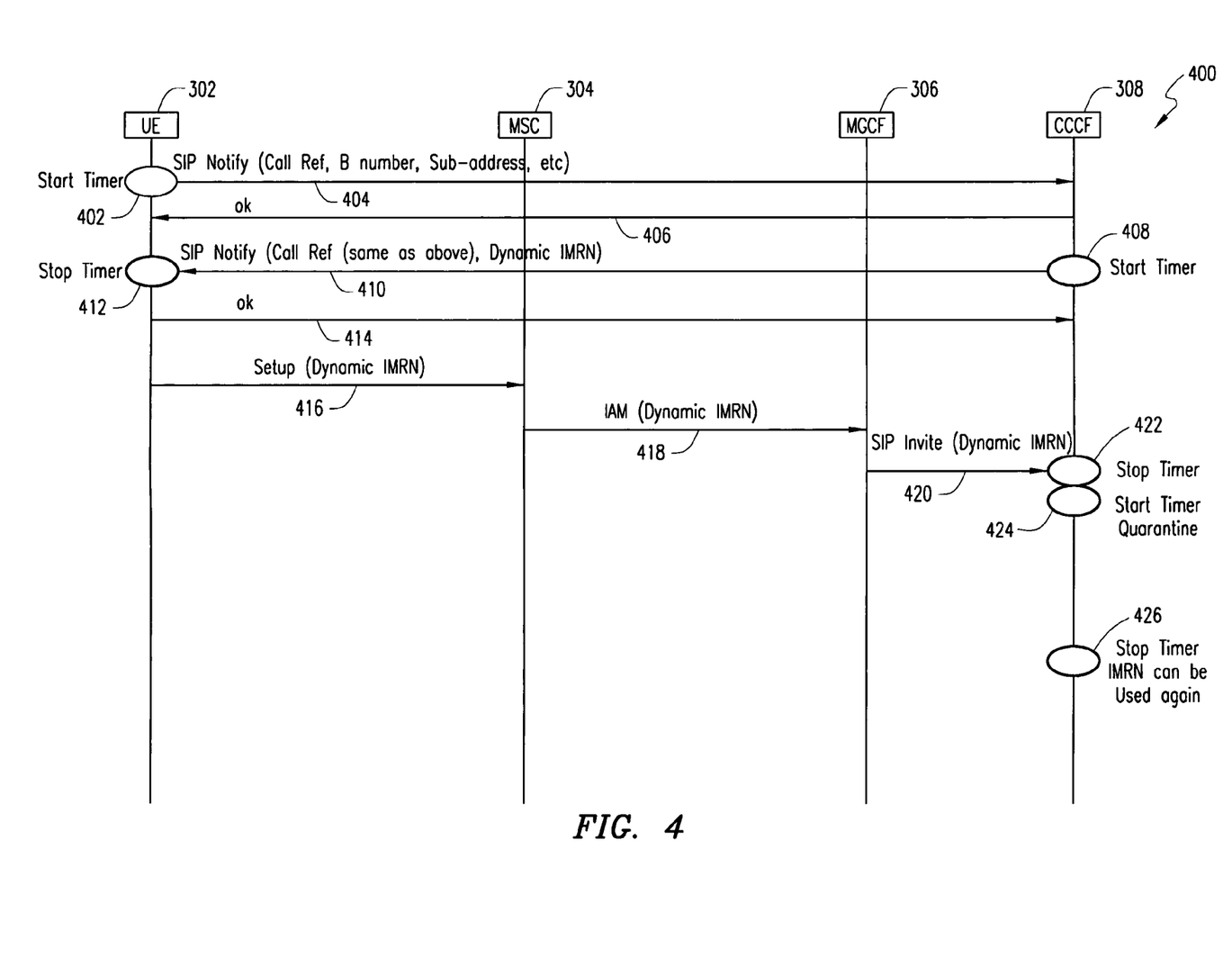
FIG. 4 depicts a message flow diagram for call routing by employing dynamically allocated IMRNs in accordance with another embodiment.

FIG. 4 depicts a message flow embodiment 400 for call routing based on dynamic IMRN allocation where a SIP Notify procedure is implemented for messaging. Similar to the CAMEL-based messaging procedure set forth above, the wireless UE device 302 having the CS domain and IMS domain modes of functionality is operable to generate a setup message to MSC 404, responsive to which a SIP Notify message 404 may be forwarded directly to the CCCF node 308. As before, the SIP Notify message 404 includes applicable call information such as call reference number, called party number, sub-address information, and the like. A suitable timer mechanism 402 may be initiated at the UE device in order to monitor a time-to-live variable associated with the call reference number. Responsive to the SIP Notify message 404, the CCCF node 308 generates an OK message 406 towards the UE device 302. Thereafter, upon verifying that the user is allowed to do a VCC call, the CCCF node dynamically allocates a select IMRN based on the received called party number and returns it back to UE 302 via a SIP Notify message 410. Again, a suitable timer mechanism may be started (block 408) at the CCCF node 308 in order to monitor a time-to-live variable associated with the dynamically allocated IMRN. An OK message 414 is generated by the UE device towards the CCCF node 308 to acknowledge receipt of the SIP Notify message 410. After verifying that the call reference has not timed out based on the UE device's timer mechanism (block 412), a setup message 416 that includes dynamic IMRN is provided by the UE device 302 to MSC 304. In response, an IAM message 418 with dynamic IMRN is generated by MSC 304 towards MGCF 306 for call routing. Similar to the messaging in CAMEL-based implementation, a SIP Invite message 420 is generated by MGCF 306 towards the CCCF node 308 which utilizes the dynamic IMRN—called party number mapping for routing the call to the called party (not shown). Also, various intermediate SIP messages and resource allocation/reservation negotiations may take place between MGCF 306 and the called party subsequent to SIP Invite 420, as before. Additional ISUP messaging may also take place before a bearer path is established between the UE device 302 and the called party.

Upon receipt of the dynamically allocated IMRN via SIP Invite 420 at the CCCF node 308, the timer mechanism may be stopped (block 422) to monitor if the IMRN is still valid. Thereafter, if the IMRN has not timed out, the CCCF may set up the call using the original called number against the IMRN to the correct destination. Additional processes such as IMRN release and quarantining, etc. may be effectuated by the CCCF node 308 similar to the processes described above. Appropriate timer mechanisms (blocks 424, 426) may accordingly be implemented at the CCCF node 308. Furthermore, the timer mechanism at the device side may also be used similarly with respect to the call reference number associated with the call.

Figure 5A:
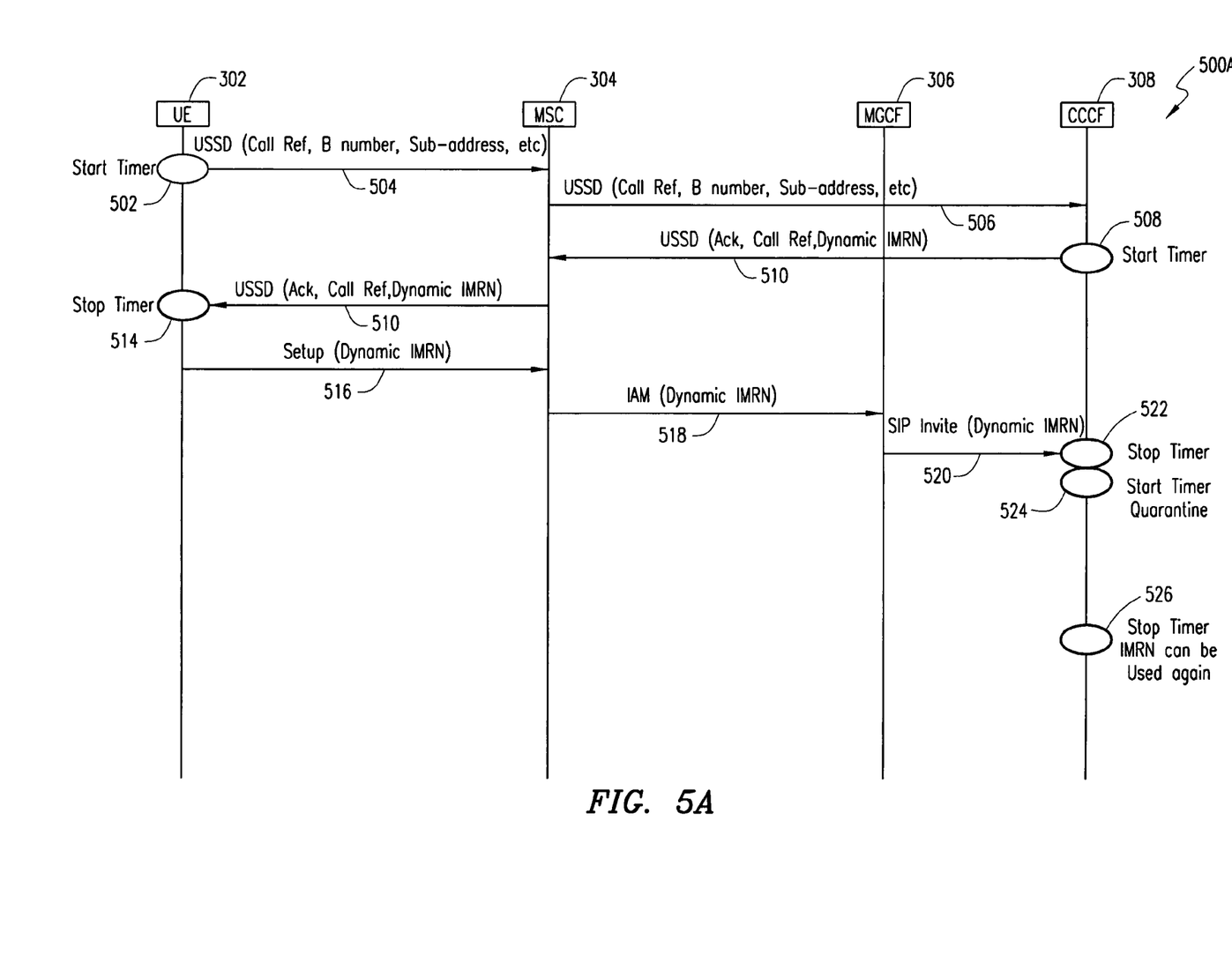
FIGS. 5A and 5B message flow diagrams for call routing by employing dynamically allocated IMRNs in accordance with a still further embodiment.

FIG. 5A depicts a message flow embodiment 500A for call routing based on dynamic IMRN allocation where Unstructured Supplementary Service Data (USSD) messaging is implemented. Similar to the messaging procedures set forth above, the wireless UE device 302 is operable to generate a USSD message 504 to MSC 404, responsive to which another USSD message 506 may be forwarded to the CCCF node 308. As before, the USSD messages 504, 506 include applicable call information such as call reference number, called party number, sub-address information, etc. A suitable timer mechanism 502 may be initiated at the UE device in order to monitor a time-to-live variable associated with the call reference number. Responsive to the USSD message 506, the CCCF node 308 generates a USSD message 510 that includes both acknowledgement as well as dynamic IMRN and call reference number information towards MSC 304. This USSD message 510 is forwarded to UE 302. Again, a suitable timer mechanism may be started (block 508) at the CCCF node 308 in order to monitor a time-to-live variable associated with the dynamically allocated IMRN. After verifying that the call reference has not timed out based on the UE device's timer mechanism (block 514), a setup message 516 that includes dynamic IMRN is provided by the UE device 302 to MSC 304. In response, an IAM message 518 with dynamic IMRN is generated by MSC 304 towards MGCF 306 for call routing. Similar to the messaging flows described previously, a SIP Invite message 520 is generated by MGCF 306 towards the CCCF node 308 for routing the call to the called party (not shown). Upon receipt of the dynamically allocated IMRN via SIP Invite 520 at the CCCF node 308, the timer mechanism may be stopped (block 522) to monitor if the IMRN has timed out. Thereafter, if the IMRN has not timed out, the CCCF may set up the call using the original called number against the IMRN to the correct destination. Additionally, processes such as IMRN release and quarantining, etc. may be effectuated by the CCCF node 308 similar to the processes described above. Appropriate timer mechanisms (blocks 524, 526) may accordingly be implemented at the CCCF node 308. Furthermore, the timer mechanism at the device side may also be used similarly with respect to the call reference number associated with the call.

Figure 5B:
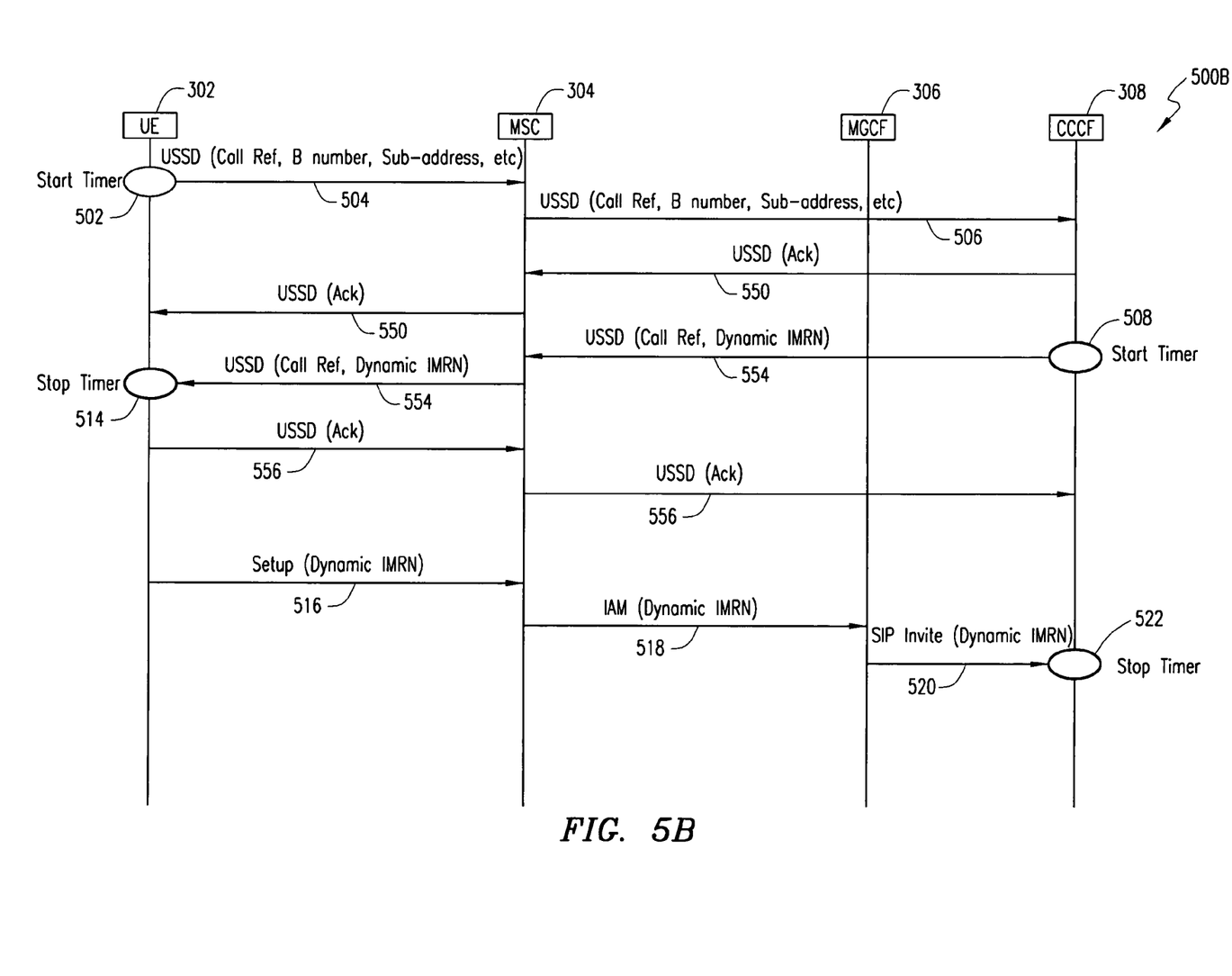

Another variation of USSD message flow embodiment 500B is shown in FIG. 5B. The message flow embodiment 500B is essentially identical to the embodiment 500A described above, except that separate USSD acknowledgement messages 550 and 556 are propagated between UE 302 and CCCF 308. Accordingly, additional USSD messaging 554 is provided for carrying the IMRN information from CCCF 308 to UE 302.

Figure 6:
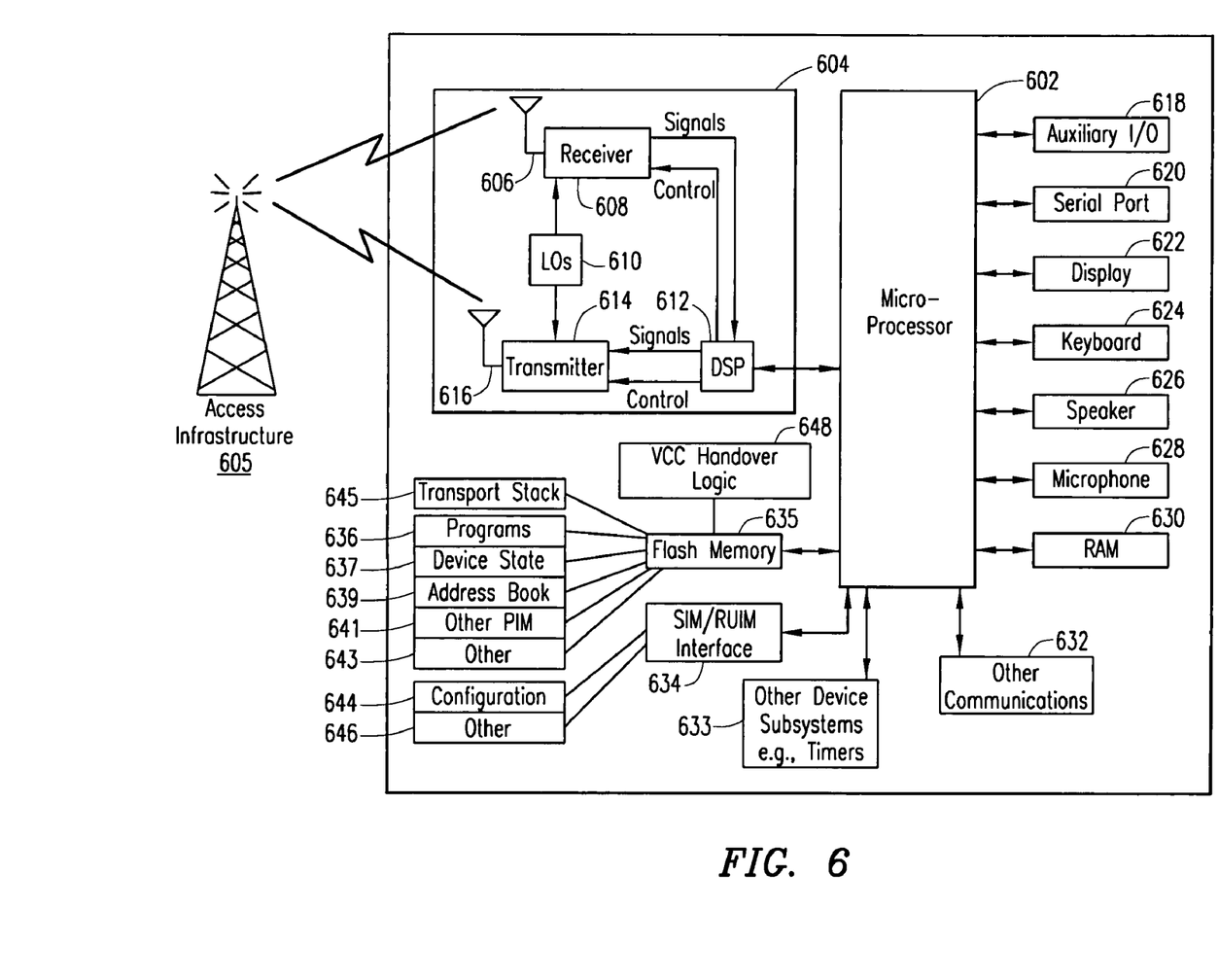
FIG. 6 depicts a block diagram of an embodiment of a communications device operable for purposes of the present patent disclosure.

FIG. 6 depicts a block diagram of an embodiment of a communications device operable as a wireless UE device, e.g., UE 302, for purposes of the present patent disclosure. It will be recognized by those skilled in the art upon reference hereto that although an embodiment of UE 302 may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent disclosure. A microprocessor 602 providing for the overall control of an embodiment of UE 302 is operably coupled to a communication subsystem 604 that is capable of multi-mode communications (e.g., CS domain, IP domain such as IMS, et cetera). The communication subsystem 604 generally includes one or more receivers 608 and one or more transmitters 614 as well as associated components such as one or more local oscillator (LO) modules 610 and a processing module such as a digital signal processor (DSP) 612. As will be apparent to those skilled in the field of communications, the particular design of the communication module 604 may be dependent upon the communications networks with which the mobile device is intended to operate (e.g., a CDMA network, a GSM network, WLAN, et cetera). Regardless of the particular design, however, signals received by antenna 606 through appropriate access infrastructure 605 (e.g., cellular base station towers, WLAN hot spots, etc.) are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616.

Microprocessor 602 may also interface with further device subsystems such as auxiliary input/output (I/O) 618, serial port 620, display 622, keyboard/keypad 624, speaker 626, microphone 628, random access memory (RAM) 630, a short-range communications subsystem 632, and any other device subsystems, e.g., timer mechanisms, generally labeled as reference numeral 633. To control access, a Subscriber Identity Module (SIM) or Removable User Identity Module (RUIM) interface 634 may also be provided in communication with the microprocessor 602. In one implementation, SIM/RUIM interface 634 is operable with a SIM/RUIM card having a number of key configurations 644 and other information 646 such as identification and subscriber-related data.

Operating system software and applicable service logic software may be embodied in a persistent storage module (i.e., non-volatile storage) such as Flash memory 635. In one implementation, Flash memory 635 may be segregated into different areas, e.g., storage area for computer programs 636 (e.g., service processing logic), as well as data storage regions such as device state 637, address book 639, other personal information manager (PIM) data 641, and other data storage areas generally labeled as reference numeral 643. A transport stack 645 may be provided to effectuate one or more appropriate radio-packet transport protocols. In addition, a call handover/continuity logic module 648 is provided for effectuating call reference ID generation, validation, verification, and correlation with IMRNs, etc. as set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for call routing by a network node disposed in a network environment including a circuit-switched (CS) network and an Internet Protocol (IP) multimedia subsystem (IMS) network, the method comprising:
    receiving a message for setting up a mobile-originated call;
    generating an IP Multimedia Routing Number (IMRN) for purposes of setting up the mobile-originated call;
    sending the IMRN to a mobile switching center (MSC);
    receiving a subsequent message containing the IMRN; and
    setting up the mobile-originated call using an original called number that maps to the IMRN, wherein the setting up of the mobile-originated call comprises inserting a CallerID by said IMS.

2. The method as recited in claim 1, wherein the network node comprises a call continuity control function (CCCF) portion.

3. The method as recited in claim 1, wherein the subsequent message is a SIP INVITE message.

4. The method as recited in claim 1, wherein the mobile-originated call was originated by a user equipment (UE) device in the CS network.

5. The method as recited in claim 4, wherein the UE device is configured to operate in CS domain and IMS domain modes of functionality.

6. The method as recited in claim 1, wherein the subsequent message was routed to the network node because the mobile-originated call may require call continuity.

7. The method as recited in claim 1, wherein the CallerID is inserted upon determining that the subsequent message did not include a CallerID.

8. The method as recited in claim 7, wherein the setting up of the mobile-originated call further comprises inserting privacy options.

9. The method as recited in claim 1, wherein the IMRN was allocated by the network node.

10. The method as recited in claim 1, wherein the IMRN was dynamically allocated.

11. The method as recited in claim 1, further comprising quarantining the IMRN upon releasing it to a pool of IMRNs for future use.

12. The method as recited in claim 1, wherein the IMRN comprises an E.164 number.

13. The method as recited in claim 1, further comprising verifying that the IMRN received in the subsequent message is valid.

14. The method as recited in claim 1, wherein the IMRN is generated by selecting an E.164 number from a pool of numbers.

15. A network node configured for facilitating call routing in a network environment including a circuit-switched (CS) network and an Internet Protocol (IP) multimedia subsystem (IMS) network, the network node comprising:
    a component configured to process a message received with respect to setting up a mobile-originated call;
    a component configured to generate an IP Multimedia Routing Number (IMRN) for purposes of setting up the mobile-originated call;
    a component configured to send the IMRN to a mobile switching center (MSC);
    a component configured to receive and process a subsequent message containing the IMRN; and
    a component configured to set up the mobile-originated call using an original called number that maps to the IMRN, wherein the setting up of the mobile-originated call comprises inserting a CallerID by said IMS.

16. The network node as recited in claim 15, wherein the subsequent message is a SIP INVITE message.

17. The network node as recited in claim 15, wherein the mobile-originated call was originated by a user equipment (UE) device in the CS network.

18. The network node as recited in claim 17, wherein the UE device is configured to operate in CS domain and IMS domain modes of functionality.

19. The network node as recited in claim 15, wherein the CallerID is inserted upon determining that the subsequent message did not include a CallerID.

20. The network node as recited in claim 19, wherein the setting up of the mobile-originated call further comprises inserting privacy options.

21. The network node as recited in claim 15, wherein the IMRN was dynamically allocated.

22. The network node as recited in claim 15, further comprising a component configured for quarantining the IMRN upon releasing it to a pool of IMRNs for future use.

23. The network node as recited in claim 15, wherein the IMRN comprises an E.164 number.

24. The network node as recited in claim 15, further comprising a component configured to verify that the IMRN received in the subsequent message is valid.

25. The network node as recited in claim 15, wherein the IMRN is generated by selecting an E.164 number from a pool of numbers.

* * * * *